May 9, 1961 A. S. SCHWARTZ 2,983,408
DISPENSING DEVICE

Filed March 23, 1959 2 Sheets-Sheet 1

INVENTOR.
ALVIN S. SCHWARTZ
BY
*Koch & Blum*
ATTORNEYS

May 9, 1961     A. S. SCHWARTZ     2,983,408
DISPENSING DEVICE

Filed March 23, 1959     2 Sheets-Sheet 2

INVENTOR.
ALVIN S. SCHWARTZ
BY Zock & Blum
ATTORNEYS

United States Patent Office 2,983,408
Patented May 9, 1961

2,983,408

DISPENSING DEVICE

Alvin S. Schwartz, 47 Secatogue Lane E., West Islip, N.Y.

Filed Mar. 23, 1959, Ser. No. 801,069

6 Claims. (Cl. 222—284)

This invention relates generally to a device for dispensing fluent materials, and is especially concerned with dispensing fluent materials in the nature of granules or powder.

While the device of the present invention has been primarily developed for use in the dispensing of instant coffee, and will be illustrated and described hereinafter with particular reference thereto, it is understood that such description is not intended in a limiting sense, but merely as illustrative, and that the device is capable of use with many varied materials, all of which applications are intended to be comprehended herein.

As is well known, instant coffees are commonly prepared by placing one teaspoon full of the coffee material in a cup and adding hot water. Stronger or weaker coffee is obtained by roughly estimating a fuller or less full teaspoon. In dealing with such small quantities, the actual variation in the amount of coffee material from that required to produce coffee of the desired strength usually amounts to a relatively high percentage of the total, so that the consumer frequently receives coffee not suited to his taste.

Accordingly, it is an important object of the present invention to provide a dispensing device for instant coffee and similar fluent materials, which device is extremely simple to operate, requiring only a single motion of one hand to dispense a precisely measured quantity of the fluent material directly into a cup or other receptacle. The present invention also contemplates the provision of means for instantaneously adjusting the device to dispense the particularly desired, accurately metered quantity.

It is another object of the present invention to provide a dispensing device of the type described which is adapted for direct connection to a container or jar, such as a jar of instant coffee, for dispensing the fluent material directly from its original container without intermediate transfer of the material, to minimize work, prevent spillage and waste, and wherein the dispenser effectively serves to seal or keep the container closed to maintain freshness of the contents throughout the entire period of use.

It is still another object of the present invention to provide a dispensing device having the advantageous characteristics mentioned in the preceding paragraphs which is simple in construction, foolproof in operation, durable and reliable in use, which can be manufactured and sold at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
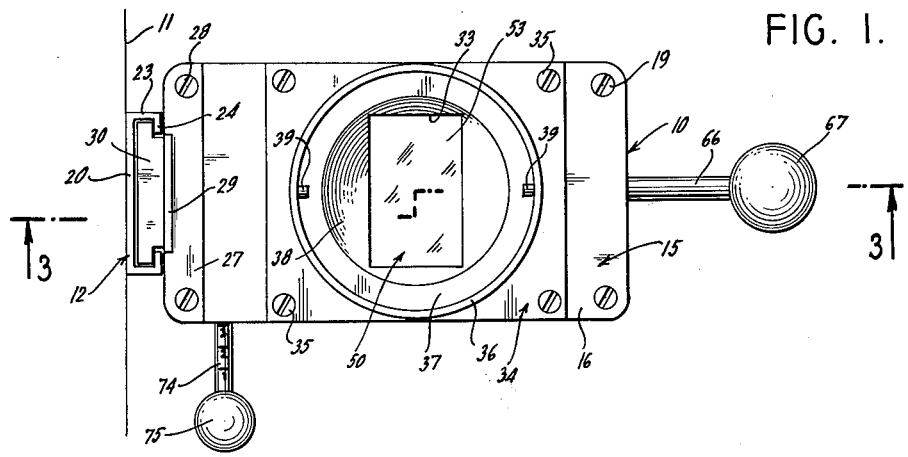
Fig. 1 is a top plan view showing a dispensing device constructed in accordance with the teachings of the present invention.
Figure 2:
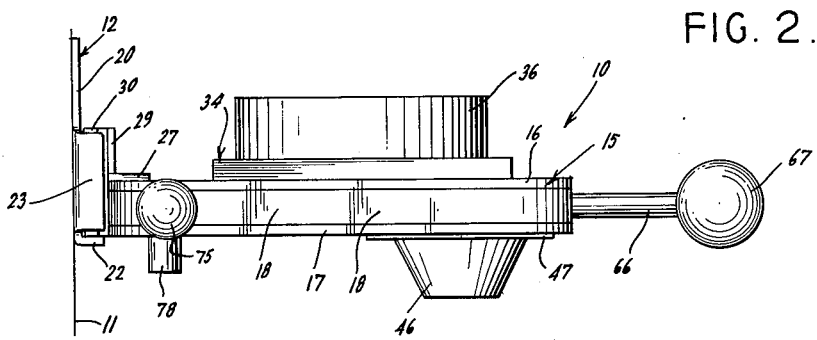
Fig. 2 is a side elevational view of the dispensing device of Fig. 1.

Referring now more particularly to the drawings and specifically to Figs. 1 and 2 thereof, the dispensing device is there generally designated 10, and illustrated as mounted on a wall surface 11 by a bracket 12.

The dispensing device includes a generally rectangular hollow housing 15 projecting generally horizontally from the wall 11. The housing includes a pair of generally rectangular, horizontally disposed, spaced superposed plates 16 and 17, the former defining the upper housing wall, and the latter defining the lower housing wall. Interposed between the upper and lower housing walls 16 and 17 is a generally rectangular open member 18 extending about the peripheries of the upper and lower walls and defining a peripheral housing wall. The upper and lower housing walls 16 and 17 may be fixed to the peripheral wall 18 by fasteners, as at 19. Thus, it will now be appreciated that an interior hollow of generally rectangular section is provided in the housing 15.

The bracket 12 may include a back plate 20 secured in facing engagement with the wall 11 by fasteners 21, and having a generally horizontal, outstanding lower edge flange or ledge 22. In addition, a pair of laterally spaced, generally vertically extending side pieces 23 project outward from the back plate 20 and are each provided with a generally vertically extending in-turned flange 24, which flanges extend toward each other, so that the side pieces 23 combine to define a generally vertically extending dovetail slot. Seated on the upper surface of the upper housing plate 16, adjacent to the inner end of the housing is an angle member 27, secured to the housing by fasteners 28, and provided with an upstanding element 29. An attachment block 30 is generally T-shaped in horizontal section, see Fig. 1, and fixed to the upstanding part 29 of angle member 27 just beyond the inner end of the housing 15. The attachment member or block is conformably engageable in the bracket 12, as by vertical downward movement therein, between the side pieces 23, and seats on the ledge 22 to removably fix the housing 15 in its horizontal disposition secured to the wall 11.

Figure 3:
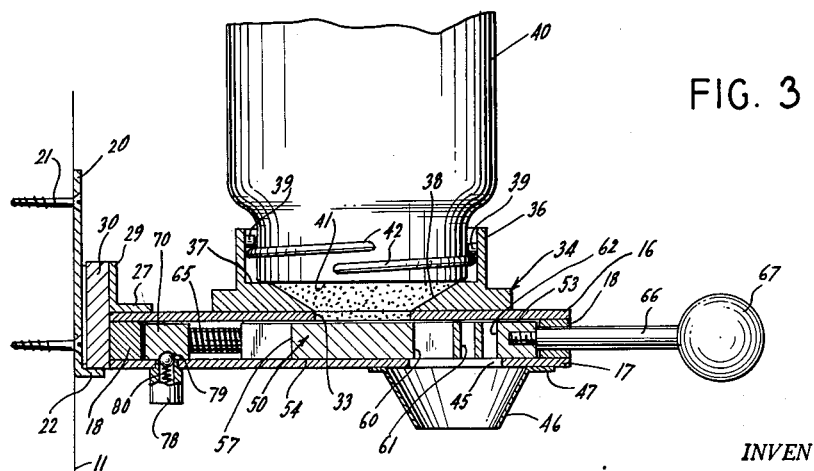
Fig. 3 is a sectional elevation view along the line 3—3 of Fig. 1 but showing the dispensing device of Figs. 1 and 2 in operative association with a container of fluent material, and in a normal non-use condition.
Figure 5:
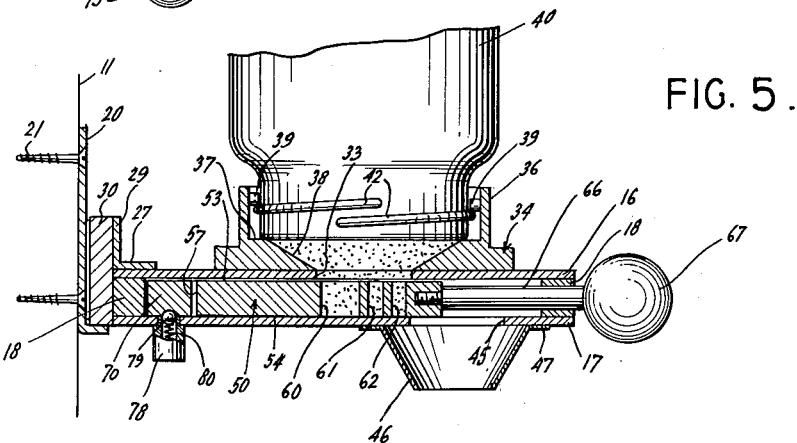
Fig. 5 is a sectional elevational view similar to Fig. 3, but illustrating the device in an intermediate stage of its operation.

Formed in the upper wall 16 of the housing 15, spaced medially between opposite inner and outer ends of the housing, is a through inlet aperture or opening 33 of generally rectangular configuration. A container support 34 is seated on the upper or external surface of the upper wall 16 over the wall opening 33, and is secured fast to the housing by fasteners 35. The support 34 is formed with an upstanding annular wall 36 which bounds an upwardly facing generally flat surface 37. A downwardly convergent inlet bore or passageway 38 extends downward centrally through the surface 37 and opens conformably into the wall opening 33. In Figs. 1, 3 and 5 it may be seen that a pair of diametrically opposed internal lugs 39 are provided on the upstanding annular wall 36, the lugs being at different elevations over the upwardly facing surface 37. An inverted jar or container 40 is illustrated in Figs. 3 and 5 as having the open end of its neck or lip 41 seated on the surface 37, with the internal lugs 39 engaging the conventional spiral beads or external screw threads 42 of the jar to maintain the latter firmly seated on the surface 37.

Formed in the generally horizontal lower wall 17 of housing 15 is a through aperture or outlet opening 45 which is spaced longitudinally of the housing from the aperture or opening 33 toward the outer end of the housing remote from the wall 11. That is, the lower wall aperture 45 is horizontally offset from the upper wall aperture 33 in the longitudinal direction of the housing; or stated otherwise, the center line of the aperture 45 is spaced from the center line of the aperture 33 longitudinally of the housing. A downwardly convergent tubular spout or funnel 46 is fixed to the underside of the lower housing wall 17, as by a flange 47 welded to the lower housing wall, or by other suitable securing means, so as to surround the outlet opening 45.

Interiorly of the housing 15, and reciprocably slidable therein longitudinally of the housing is a carrier or plate 50. The carrier or plate 50 is of generally rectangular configuration, having its side edges 51 and 52 closely adjacent to the internal longitudinal side surfaces of the peripheral wall 18 to constrain the carrier plate to its longitudinal reciprocatory movement. Also, the generally horizontally disposed carrier plate 50 is of a thickness such that its upper and lower faces or surfaces 53 and 54 are closely adjacent to the interior surfaces of the upper and lower housing walls 16 and 17, respectively.

Figure 4:
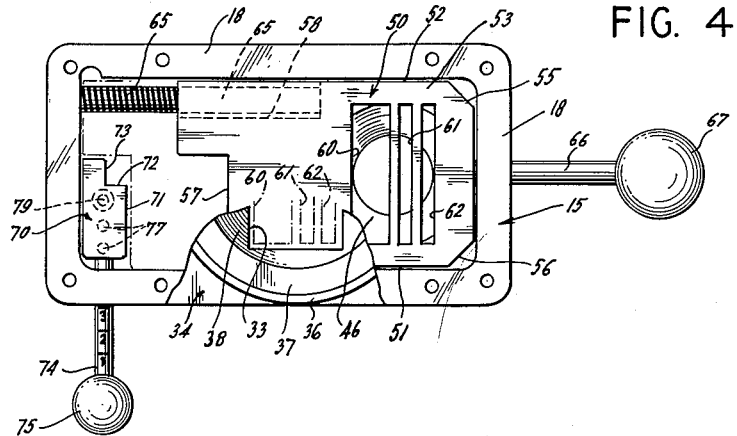
Fig. 4 is a top plan view similar to Fig. 1, but with parts removed and broken away for clarity of understanding and shown in the normal non-use condition of Fig. 3.
Figure 6:
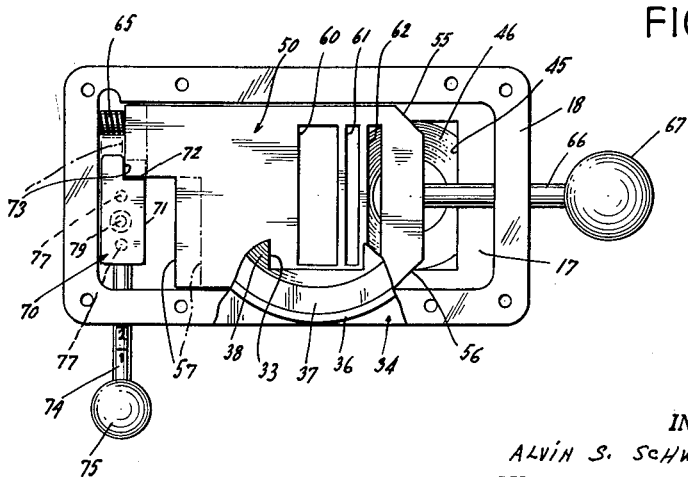
Fig. 6 is a top plan view with parts broken away similar to Fig. 4, but illustrating another condition of operation in solid lines, and still another condition of operation in dot-and-dash outline.

As best seen in Figs. 4 and 6, the pair of corners or carrier plate 50 at the outer end thereof are bevelled or chamfered, as at 55 and 56. Also, the inner end of the carrier plate 50, at one corner thereof, is cut away, as at 57, to define a generally rectangular cutout opening through one side edge of the plate and facing toward the inner end of the housing. Also, an internal recess or bore is formed in the carrier plate 50, see 58 in Fig. 4, which bore or recess opens through the inner end of the carrier plate spaced laterally from the cutout 57.

In addition, a plurality of through apertures or openings 60, 61 and 62 are formed in the plate 50, which are each of rectangular configuration, and arranged in side by side relation to define overall rectangular configuration. It will be observed that the through opening 60 is relatively large, while the through openings 61 and 62 are relatively small. That is, the innermost opening 60 is larger than the intermediate opening 61 and outermost opening 62. The openings 60, 61 and 62 are located and arranged in the carrier plate 50 such that upon inward shifting movement of the carrier plate to its extreme inner position, as indicated in dot-and-dash outline in Fig. 4, the openings are all located directly beneath, so as to register with the inlet opening or passageway 33, 38. Of course, upon lesser inward movement of the slide or carrier 50, only the innermost opening 60 may be caused to lie directly beneath and register with the inlet passageway 33, 38, or only the innermost and intermediate openings 60 and 61 may be caused to lie directly beneath and register with the inlet passageway, as seen in solid lines in Fig. 6.

In its extreme outermost position of sliding movement, the carrier 50 is located to position the openings 60, 61 and 62 all directly over the discharge opening 45, 46, as best seen in Fig. 3.

A coil spring 65, or other suitable resilient means, may be provided to urge or bias the slidable carrier 50 to its extreme outward position of movement. In particular, the coil spring 65 has one end engaged in the recess or bore 58 of the carrier and extends therefrom to have its other end engaging the inner peripheral wall of the housing. An actuating member or rod 66 has one end fixed to the outer end of the carrier 50, and extends therefrom outward slidably through the outer end wall of the housing where it is provided with a manually actuable member or knob 67. Thus, the carrier 50 is manually actuable by hand engagement of the knob 67 to shift the carrier longitudinally inward against the force of spring 65, and upon release of the actuating member 66, 67, the spring 65 serves to return the carrier longitudinally outward.

Interiorly of the housing 15, adjacent to the inner end thereof, is provided a stop member 70 having one side 71 facing generally toward the cutout 57 of the carrier. The stop member 70 has its side 71 cut away at 72 to define a step or stepped formation 73 facing toward the carrier cutout 57. An actuating member or rod 74 has one end fixed to the stop member 70 interiorly of the housing 15 and projects therefrom slidably through the side wall of the housing adjacent to the carrier cutout 57, where it is provided with a hand knob 75. The stop member 70, by its generally rectangular cross sectional configuration, see Figs. 3 and 5, is constrained against other than translational or sliding movement longitudinally of the actuating member 74. This translational or sliding movement is necessarily transverse or normal to the direction of sliding movement of the carrier 50, as the rod 74 is tranverse or normal to the rod 66. Provided on the undersurface of the stop member 70 are a row of generally semi-spherical indentations or recesses 77. Mounted in the lower housing wall 17, directly beneath the stop member 70, is an upwardly facing cup 78 carrying a ball 79 resiliently urged upward by a spring 80 toward the interior of the housing and against the underside of the stop member 70. Upon sliding movement of the stop member in response to actuation of the actuating member 74, 75, the ball 79 engages in the recesses 77 to releasably hold the stop member in any of three selected positions of its shifting movement. The rod 74 is provided with numerical indicia, see Figs. 1, 4 and 6, indicating the position of the stop member 70 in the housing 15, and specifically the engagement of the ball or detent 79 in a respective recess 77.

As mentioned hereinbefore, the phantom position of the carrier 50 in Fig. 4 represents an extreme inner position of carrier movement. In Fig. 6 it will be noted that the stop member 70 has been shifted transversely inward in the solid line position, so that the stop member is not entirely received in the carrier cutout 57 upon inward movement of the carrier, as in the phantom position of Fig. 4. Rather, in the solid line position of Fig. 6, the stop member step 73 engages with the inner end of the carrier to limit inward movement of the latter to a position with only openings 60 and 61 beneath the inlet passageway 33, 38, and with the stop member 70 only partially received in the cutout 57.

In the extreme inner position of stop member movement, the phantom position illustrated in Fig. 6, it is apparent that the side or edge 71 of the stop member will engage the inner end of the carrier to limit inward movement of the latter and prevent even partial entry of the stop member into the cutout 57. In this condition only the single opening 60 will be located beneath the inlet passageway 33, 38.

It will now be apparent that the dispensing device 10 may be applied to a container or jar of coffee 40, or the like, by removal of the dispenser from its supporting bracket 12 and inversion of the dispenser for screwing onto the neck of the container. The dispenser is then righted, thereby inverting the container 40, and the dispenser replaced in the supporting bracket 12, to assume the condition of Fig. 3. In order to quickly and accurately dispense the desired quantity of coffee granules or other fluent material, it is only necessary to set the adjustment member 74, 75 at the desired location, and then press and release the actuating element 66, 67. According to the setting of the adjustment element 74, 75, the carrier 50 moves, to its receiving position to locate either one, two, or three of openings 60, 61, and 62 directly beneath the inlet 33, 38. The openings so positioned receive the fluent material, and upon outward or return movement of the carrier 50, transport the received material to a discharge position directly over the outlet opening 45, where the transported material gravitationally falls from the openings, through the outlet and funnel 46 into a waiting cup.

From the foregoing, it is seen that the present invention provides a dispensing device for fluent material which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A dispensing device for fluent material, said device comprising a hollow housing having generally horizontal parallel spaced upper and lower walls, a support fixed on the upper surface of said upper wall and having an upwardly facing surface defining a seat for an inverted container of fluent material, there being an inlet opening extending downward centrally through said upwardly facing support surface and through said upper housing wall into the interior of said housing, said lower housing wall being provided with an outlet opening located in forwardly offset relation with respect to said inlet opening, a generally horizontal carrier plate located in said housing closely received between said upper and lower walls and mounted for forward and rearward reciprocatory sliding movement between said inlet and outlet openings, said carrier plate being formed with a plurality of vertical through carrier openings spaced apart longitudinally of carrier plate movement and moveable with said carrier plate between an extreme receiving position with all of said carrier plate openings beneath said inlet opening and a discharge position with all of said carrier plate openings over said outlet opening, and a stepped stop member in said housing located for abutting engagement with said carrier plate upon movement of the latter to a receiving position, said stop member being mounted in said housing for movement transversely of said carrier plate movement to position a selected stepped region for abutting engagement with said carrier plate to selectively limit movement of the latter to additional receiving positions with a selected number of said carrier plate openings beneath said inlet, whereby fluent material is adapted to flow gravitationally through said inlet opening to fill a selected number of said carrier plate openings beneath said inlet opening and be moved with said carrier plate into position over said outlet opening for gravitational discharge therethrough.

2. A dispensing device according to claim 1, in combination with resilient means mounted interiorly of said housing and in engagement with said carrier plate to urge the latter forward toward its discharge position, and manually actuable means projecting from said carrier plate exteriorly of said housing and moveable with said carrier plate for manually effecting movement of the latter against the force of said resilient means by push-button operation.

3. A dispensing device according to claim 1, in combination with an annular upstanding wall on the upper surface of said support spacedly circumscribing said inlet opening, and a plurality of internal lugs on said annular wall for retaining engagement with an inverted container seated on said support surface.

4. A dispensing device according to claim 1, said inlet opening being downwardly convergent, and a downwardly convergent spout on the underside of said housing surrounding said outlet opening, for constraining gravitational flow of material through said inlet and outlet openings.

5. A dispensing device according to claim 1, said carrier plate being formed with a cutout opening toward said stepped stop member, and interengageable detent means on said housing and stop member for holding the latter at a selected position of movement for a desired degree of reception in said cutout.

6. A dispensing device for fluent material, said device comprising a generally forwardly and rearwardly extending hollow housing having horizontal, parallel spaced upper and lower internal walls, a support fixed medially on the upper side of said housing and having an upwardly facing surface defining a seat for an inverted container of fluent material, an annular upstanding retaining wall on said support for removably receiving and retaining an inverted container seated on said upwardly facing surface, there being an inlet opening extending downward centrally through said upwardly facing support surface and through said upper housing wall into the interior of said housing medially thereof, said lower housing wall being provided with an outlet opening spaced forwardly of said inlet opening, a generally horizontal forwardly and rearwardly extending carrier plate located conformably within said housing closely received between said upper and lower walls and mounted for forward and rearward reciprocatory sliding movement in said housing, said carrier plate being formed with a plurality of vertical through-carrier openings spaced apart longitudinally of carrier-plate movement and movable with said carrier plate between an extreme receiving position with all of said carrier-plate openings beneath said inlet opening and a discharge position with all of said carrier-plate openings over said outlet opening, a coil compression spring in the rearward region of said housing and in bearing engagement with the rearward region of said carrier plate to constantly urge the latter forward, a manually actuable element projecting forward from said carrier plate slidably through and exteriorly of said housing and movable with said carrier plate for manually effecting movement of the latter against the force of said spring, said carrier plate being provided in its rearward region with a cutout, and a stepped stop member located in the rearward region of said housing and mounted for lateral shifting movement therein between a first position in alignment with said carrier-plate cutout for reception therein and successive positions having respective steps engageable with the rearward end of said carrier plate to selectively limit movement of the latter to additional receiving positions with a selected number of said carrier-plate openings beneath said inlet, whereby fluent material is adapted to flow gravitationally through said inlet opening to fill a selected number of said carrier-plate openings beneath said inlet opening and be moved with said carrier plate into position over said outlet opening for gravitational discharge therefrom.

References Cited in the file of this patent

UNITED STATES PATENTS

| | | |
|---|---|---|
| 19,342 | Breckenridge | Feb. 16, 1858 |
| 1,979,428 | Wheeler | Nov. 6, 1934 |
| 2,127,092 | Sovad et al. | Aug. 16, 1939 |
| 2,176,562 | Rose | Oct. 17, 1939 |